US007746860B2

(12) United States Patent
Tams et al.

(10) Patent No.: US 7,746,860 B2
(45) Date of Patent: Jun. 29, 2010

(54) TESTING APPLICATIONS OR DEVICES IN LARGE NETWORKS

(75) Inventors: Jonathan Gilbert Gordon Tams, Edinburgh (GB); David James Stevenson, Livingston (GB); Iain Hogg, Edinburgh (GB)

(73) Assignee: 3Com Corporation, Marlborough, MA (US)

( * ) Notice: Subject to any disclaimer, the term of this patent is extended or adjusted under 35 U.S.C. 154(b) by 927 days.

(21) Appl. No.: 11/192,772

(22) Filed: Jul. 29, 2005

(65) Prior Publication Data

US 2006/0251075 A1 Nov. 9, 2006

(30) Foreign Application Priority Data

May 9, 2005 (GB) ................. 0509409.9

(51) Int. Cl.
*H04L 12/28* (2006.01)
*H04L 12/56* (2006.01)
(52) U.S. Cl. ....................... 370/392; 370/428
(58) Field of Classification Search ........... 370/331, 370/389, 392, 400, 401, 428, 467, 469, 500, 370/241
See application file for complete search history.

(56) References Cited

U.S. PATENT DOCUMENTS 6,101,189 A * 8/2000 Tsuruoka ............... 370/401

| | | | |
|---|---|---|---|
| 7,082,118 B1 * | 7/2006 | Sethi | 370/349 |
| 7,352,706 B2 * | 4/2008 | Klotz et al. | 370/254 |
| 2003/0093563 A1 * | 5/2003 | Young et al. | 709/245 |
| 2003/0097438 A1 * | 5/2003 | Bearden et al. | 709/224 |
| 2008/0107065 A1 * | 5/2008 | Lescuyer et al. | 370/328 |

FOREIGN PATENT DOCUMENTS

GB 2362301 A 11/2001

OTHER PUBLICATIONS

Great Britian Combined Search and Examination Report, Aug. 12, 2005.

* cited by examiner

*Primary Examiner*—Ricky Ngo
*Assistant Examiner*—David Oveissi

(57) ABSTRACT

When testing network management applications, it is desirable to show that they will work with large or very large networks, to determine the upper bounds of the applications capabilities, and improvements which might increase the upper bounds. A method of testing a network application is disclosed mapping a layer-3 addresses of a real subnetwork onto a plurality of mapped layer-3 subnetwork addresses for conversations with applications or devices. Packets are modified to change a destination layer-3 address in a mapped subnetwork, pointing to corresponding real IP address and forwarding the packets. The conversation to which a response from a reallayer-3 address relates is identified. The source layer-3 address and packet contents are changed into the appropriate mapped subnetwork and the packet is forwarded to the application or device. An existing test network of any size may be used as the basis for testing the network management application.

2 Claims, 2 Drawing Sheets

TESTING APPLICATIONS OR DEVICES IN LARGE NETWORKS

BACKGROUND OF THE INVENTION

This invention relates to testing network applications or devices.

The background to the invention will be explained in relation to network management applications. Those skilled in the art will appreciate that the invention has wider application, however.

It is desired to test network management applications to show, for example, that they will work with large or very large networks, to determine the upper bounds of the applications capabilities, and to determine improvements which might, for example, increase the upper bounds.

There are a number of alternatives. One would be to construct a very large network for the specific purpose of testing the application. Another would be to test it on a customer's existing network. A third possibility would be to program a device simulator to simulate a large number of devices and to test the application against the simulator.

To construct a large network just for the purpose of testing an application would be extremely expensive, would require large amounts of lab space and would not be feasible for most testers. Setting up such a network is complex and prone to error.

Few customers would want to test a new unproven management application on their real live network. The implications of the discovery of problems (the reason for testing) are that the network may work less than satisfactorily.

Programming device simulators is a time consuming task and is highly complex, making it prone to error. In order to simplify the process most device simulators allow the user to define a template for simulating a specific device type and then use that to define specific instances of the devices. However, even this is of little help when trying to set up a large simulation, as there are huge numbers of values that need to be defined for multiple instances of a device type in order to correctly simulate a large network. Further problems with this approach are that it is difficult to capture in a simulator any idiosyncrasies that specific types of devices may have, preventing the system from accurately simulating devices. It is difficult to simulate network traffic and its effects upon the network management application within device simulators. When very large networks are being simulated, the device simulator itself may very quickly fail to cope with the load placed on it by the network management application.

Against this background, in accordance with the invention there is provided a method of testing a network application or device, comprising the steps of: providing a mapping of the layer-3 address of a real subnetwork onto a plurality of mapped layer-3 subnetwork addresses for conversations with the application or device; modifying a packet to change a destination layer-3 address in a mapped subnetwork, to point to the corresponding real layer-3 address and forwarding the packet on; identifying to which conversation a response from a real layer-3 address relates; modifying the source layer-3 address into the appropriate mapped subnetwork and forwarding the packet to the application or device with the conversation identity. In operation, an existing test network of any size may be used as the basis for testing the network management application. In an embodiment, a small driver, the "IP address mapping shim" (simply referred to as the shim hereafter), working within the network stack of the server running the network management application, maps one or more (usually private) IP subnets onto the real IP subnet of the test network. The former IP subnets are hereafter referred to as mapped subnets, while the latter subnet is hereafter referred to as the real subnet.

The preferred embodiment of the invention allows usage against a test network that has multiple real IP subnets associated with it.

SUMMARY OF THE INVENTION

The method preferably includes sending a packet containing a unique session ID from the application or device to a mapped network, recording the unique session ID and the mapped subnetwork the packet was sent to, modifying the destination IP address to point to the real IP address and forwarding the packet on, receiving a packet from the real IP subnetwork, using the unique session ID to identify the conversation to which it relates, modifying the source IP and packet contents into the appropriate subnetwork and forwarding the packet to the application or device.

In some protocols, the session ID is not unique. In this case the method may include modifying a non-unique session ID of a packet into a unique session ID, forwarding the packet to the real IP subnetwork, and modifying a unique session ID in a packet received from the real IP network to restore the original non-unique session ID.

In some protocols, a message may be sent by a network device, other than in immediate reply to a message from the network management application. In this case a record of the correspondence may be retained between each unique session ID and its non-unique session ID until the conversation has been completed.

In order to allow a source MAC address to be included in a response from a mapped device, the method may include mapping each MAC address in the real subnetwork onto a plurality of mapped MAC addresses each corresponding to a respective mapped IP address subnetwork, replacing the mapped MAC address with the real MAC address corresponding to the respective mapped IP address subnetwork in the payload of packets forwarded to the real subnetwork, and replacing the real MAC addresses with the mapped MAC addresses corresponding to the conversation in the payload of packets forwarded to the application or device.

The invention extends to apparatus for testing a network application or device, comprising: means providing a mapping of each layer-3 address in a real subnetwork onto a plurality of mapped layer-3 addresses for conversations with the application or device; means arranged to modify a packet to change a destination layer-3 address in the mapped subnetwork, to point to the corresponding real layer-3 address and to forward the packet on; means arranged to identify to which conversation a response from a real layer-3 address relates; and means arranged to modify the source layer-3 address into the appropriate mapped subnetwork and to forward the packet to the application or device with the conversation identity.

The invention also extends to a computer program recorded on a computer readable medium loadable into a digital computer, or embodied in a carrier wave, said computer program comprising software for performing all the steps.

BRIEF DESCRIPTION OF THE DRAWINGS

One example of the invention will now be described, by way of example, with; reference to the accompanying drawings, in which.

DETAILED DESCRIPTION

Figure 1:
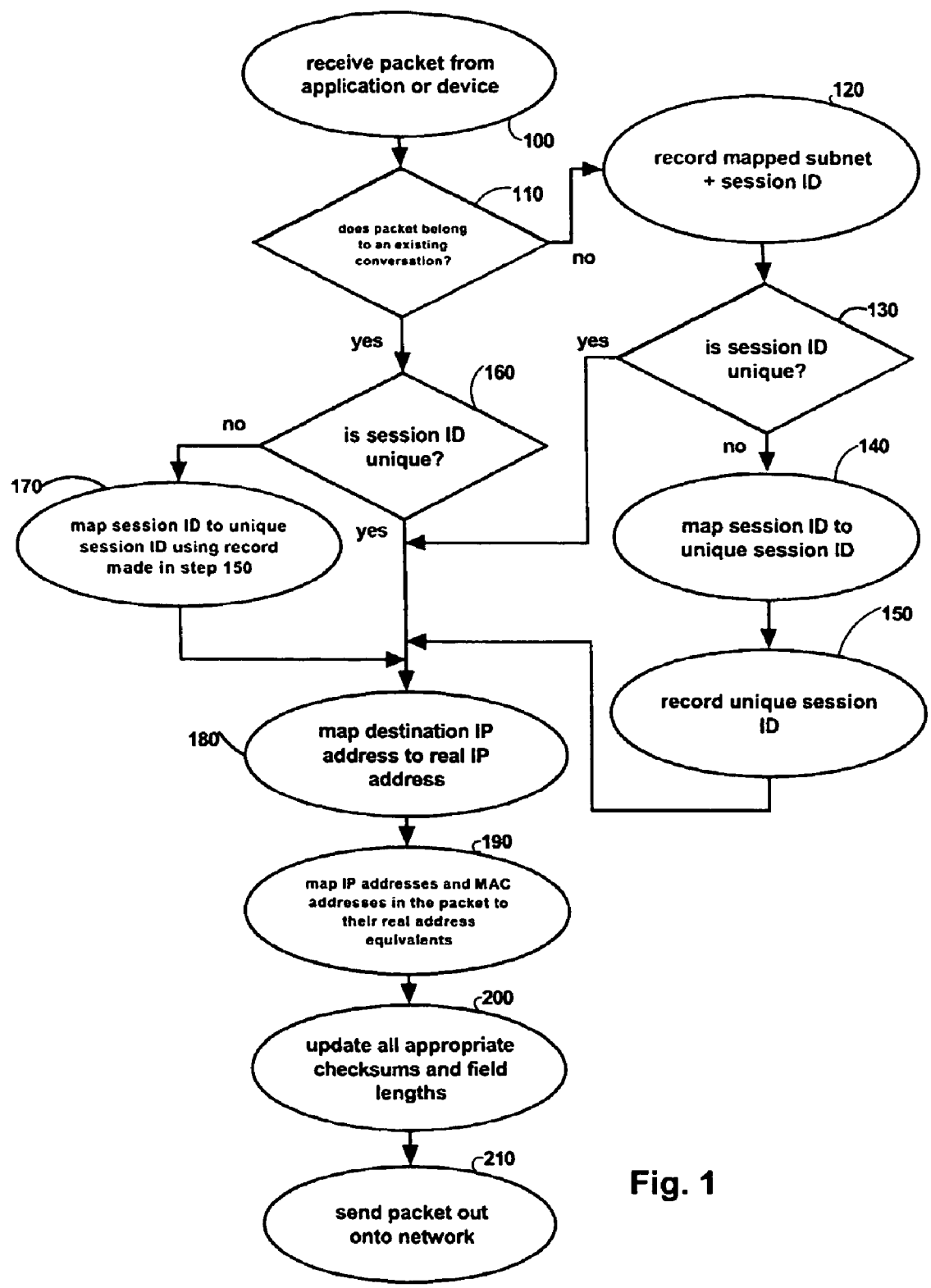
FIG. 1 is a flow diagram illustrating a program for modifying packets sent from an application or device to a real network, in accordance with the invention.

The network management application under test is configured to manage the mapped subnets. Any traffic sent from the network management application to a mapped address (i.e. an address on a mapped subnet) passes through the shim and has any mapped addresses it contains mapped across to their corresponding real addresses (i.e. the corresponding addresses on the real subnet). Similarly any traffic received from a real address passes through the shim and has any real addresses it contains mapped back to the appropriate mapped addresses before being forwarded to the network management application.

By using the shim to map multiple IP subnets onto the real IP subnet of the test network the user can simulate a network of any desired size, and so test the scalability of their network management application.

Conversation Tracking

Mapping multiple IP subnets onto the test network's IP subnet effectively creates multiple IP aliases for each device. For example, if the real test network has an IP subnet of 192.168.123.0/255.255.255.0 and the driver is configured to map IP subnets 10.0.0.0/255.255.255.0, 10.0.1.0/255.255.255.0 and 10.0.2.0/255.255.255.0 onto that test network then the device with the real IP address 192.168.123.1 will have traffic destined to IP addresses 10.0.0.1, 10.0.1.1 and 10.0.2.1 redirected to it by the IP address mapping shim.

The problem then arises of how to handle conversations that are to be mapped. If the network management application sends a packet to 10.0.1.1 then the shim redirects this packet to 192.168.123.1, mapping its contained IP addresses to the 192.168.123.0/255.255.255.0 subnet appropriately. Any response to this packet will come from 192.168.123.1. So that the network management application can operate correctly, the shim must ensure that the source IP address of the packet gets mapped back to 10.0.1.1 and any real addresses within the packet get mapped back to their corresponding addresses on the subnet 10.0.1.0/255.255.255.0. However, the received response itself will not contain enough information in order to identify the mapped subnet that the addresses in the packet are to be mapped into.

As a result, it is necessary to track any conversations initiated by the network management application, recording enough information to identify any packets belonging to the conversation, regardless of whether they are being sent to, or received from the test network, and to map the addresses contained within the conversation appropriately.

There is no generic method that may be employed for this tracking process, as the presence, location and usage of session IDs within packets is protocol-dependent. As a result the shim must have support implemented for each protocol that it is to process.

For protocols where unique session IDs are used for conversations, regardless of destination, the tracking process is straightforward. If a packet is being sent by the network management application to a mapped subnet then its session ID recorded, along with details of the mapped subnet that it was originally destined to, the packet contents are mapped appropriately (see later), the destination IP address is modified to point to the corresponding real IP address and the packet is forwarded on. If a packet is received from the real IP subnet then its session ID is used to look up the conversation details, the source IP address and packet contents are mapped back into the mapped subnet indicated by these details and the packet is passed up to the network management application.

However, for many protocols the session IDs used for conversations are not unique enough to support this tracking. For these the process must be modified further so that the existing session IDs are changed to unique session IDs. In order to do this a simple "next session ID" value can be employed and maintained by the shim. If a packet is being sent by the network management application then, prior to the processing indicated above, its existing session ID is recorded and then replaced with the current "next session ID" value, which is also recorded. The "next session" ID is then incremented to ensure that the next conversation has a unique session ID. If a packet is received from the real IP subnet for such a conversation then its session ID will be this recorded "next session ID", which is used to look up the conversation details and then the session ID in the packed is mapped back to its original value prior to the processing indicated above. This is necessary in order for the network management application to be able to still correctly identify the conversation internally.

Note that, where the protocol supports true conversations, such as any TCP-based protocol, as opposed to query/response protocols, such as SNMP, the process is complicated further as it is possible that a packet received from the network management application may correspond to an existing conversation. In such a case it is important that the same "next session ID" is used for the packet as for previous packets in the conversation. In order to achieve this it is necessary that the shim retains details of ongoing conversations in its tables until that conversation has been completed, and those details are used to perform mapping for packets belonging to existing conversations regardless of its direction.

Note that completion of a conversation may be determined in varying manners and is generally protocol-specific. For example, for TCP-based protocols it is possible to look for appropriate exchanges of FIN and ACK packets. Alternatively, as TCP conversations time out after a set period of inactivity, any TCP conversation that shows the appropriate length of inactivity can be considered complete. The former approach here is much more complex, however the latter approach is more resource-hungry.

Mapping Packet Contents

As indicated above, the shim cannot limit itself to mapping the destination IP address of packets received from the network management application and the source IP address of packets received from the real IP subnet, but must also perform mapping of the packet contents. This is necessary in order to allow the shim to fully simulate large networks, as the contents of responses from devices on different mapped IP subnets should indicate addresses on the corresponding mapped IP subnet.

The process of mapping packet contents can be simply summarized as identifying all addresses in the packet and mapping them in the appropriate direction. However, the actual process is protocol-specific, and varies widely in the level of complexity required. For example, consider the two protocols DNS and SNMP.

DNS messages have a fairly straightforward message format that allows for the easy identification of blocks within the message that may contain IP addresses, consisting as it does of a header followed by a set of questions (i.e. queries) followed by a set of answers (i.e. responses) followed by authority and other additional information. Questions and answers, which may contain IP addresses also follow a straightforward structure and include, among other things, a type, a class and data. The questions and answers that contain IP addresses can be easily identified as those with a type of PTR (pointer) and a class of INTERNET that do not start with a certain byte value (0×C0). The IP addresses themselves are stored as literal text in-addr.arpa domain host names. Once they have been identified they can be extracted and mapped quite simply, with the message size being adjusted accordingly.

SNMP messages, on the other hand, have a format which is much more difficult to determine. This makes the location of IP addresses much more complex. This is a combination of several factors:

The message contents are stored as an ASN.1 tree, encoded using BER. This vastly complicates the problem of identifying where fields start and end within the message.

There is no generic method of identifying the leaves in the ASN.1 tree that contain IP addresses. There is a type field associated with each node in the ASN.1 tree, and there is an IP address type—any leaf with its type set to IP address can be automatically identified and mapped (although there are situations where this is not desirable, such as where the IP address is being used to set an SNMP trap destination). However, IP addresses are also sometimes used in OIDs, primarily as table indices, and are sometimes stored textually in octet strings. There is no reliable method of identifying their use in such cases.

Even if it is known that an OID holds IP address(es), there is no generic method of identifying the location within the OID where the IP address(es) are held.

Due to the way in which the BER encoding mechanism works, mapping a single IP address may result in changes to the encoded sizes of nodes all the way up the ASN.1 tree to its root.

As a result, in order to map the IP addresses within an SNMP message it is first necessary to have a list of OIDs that contain IP address(es) and of OIDs whose corresponding values contain IP address(es). For those OIDs that contain IP address(es) it is also necessary to know at what location in the OID the IP address(es) appear. Once this information is available the following process can be followed:

1. Parse the entire SNMP message into an ASN.1 tree.
2. Iterate through the tree structure.
3. For each leaf node in the tree that contains an OID:
    a. Check to see if the OID and/or its corresponding value contain IP address(es).
    b. If the OID contains IP address(es) then map each IP address in the OID appropriately.
    c. If the OID's corresponding value contains IP address(es) then locate the leaf node containing that value and map each IP address in the value appropriately.
4. If changes were made to the values held in the tree that have affected the encoded sizes of nodes then re-size the message accordingly and re-encode the tree.

MAC Address Handling

Network management applications that include a network mapping component frequently rely upon MAC address information held by devices to help in determining network topology. As the shim processing outlined above is intended to be used to map multiple (mapped) IP subnets onto a single (real) IP subnet then, without further mapping, this can result in the network management application seeing multiple devices with different mapped IP addresses that all have the same MAC address information. To re-use the example outlined previously, a network management application that retrieved the interface tables via SNMP for the devices with IP addresses 10.0.0.1, 10.0.1.1 and 10.0.2.1 would find that all three devices have identical MAC addresses recorded for their interfaces. This duplication of MAC addresses across devices could prevent the network management application from correctly resolving the network topology.

In order to prevent this from happening, the shim must also provide MAC address mapping that ensures that:

1. A real MAC address always maps to the same mapped MAC address for any one mapped IP subnet. This ensures that there is consistent use of MAC addresses within a mapped IP subnet.
2. A real MAC address maps to two different mapped MAC addresses for any pair of mapped IP subnets. This ensures that there is no duplication of MAC addresses between different mapped IP subnets.

To simplify the user's configuration task, an automated process can be employed by the shim for determining the appropriate MAC addresses to use as the mapped MAC addresses. One such automated process is as follows:

1. A global look-up table is maintained that is keyed on MAC OUI (Organizationally Unique Identifier), and that stores a three-byte "next host address" value.
2. A MAC address mapping table is maintained for each mapped IP subnet that maps mapped MAC addresses to real MAC addresses and vice versa.
3. During the mapping of a packet's contents, the MAC address mapping table associated with the mapped IP subnet that corresponds to the packet is used to map any MAC addresses contained within the packet in the appropriate direction.

If no mapping is available for a MAC address, and the packet contents are being mapped from real addresses to mapped addresses, then a new mapped MAC address is generated for performing the mapping. This is achieved by using the global lookup table to look up the next host address to use for the OUI of the MAC address. The combination of the OUI and next host address value provide the mapped MAC address that is to correspond to the real MAC address for the mapped IP subnet that corresponds to the packet. This mapped MAC address and its corresponding real MAC address are then recorded in the MAC address mapping table associated with the mapped IP subnet that corresponds to the packet. The next host address value is then incremented in the global look-up table to prevent duplicate MAC addresses for that OUI.

Checksums and Length Fields

As the processing indicated above will result in the contents of the packet being updated this will invalidate one or more checksum fields within the packet, and may alter the overall length of the packet. As a result, after all of the above processing has been completed it is necessary to update all appropriate checksums and length fields in the packet, and do this in the appropriate order in order to ensure that the new values are valid.

Method Summary

Figure 2:
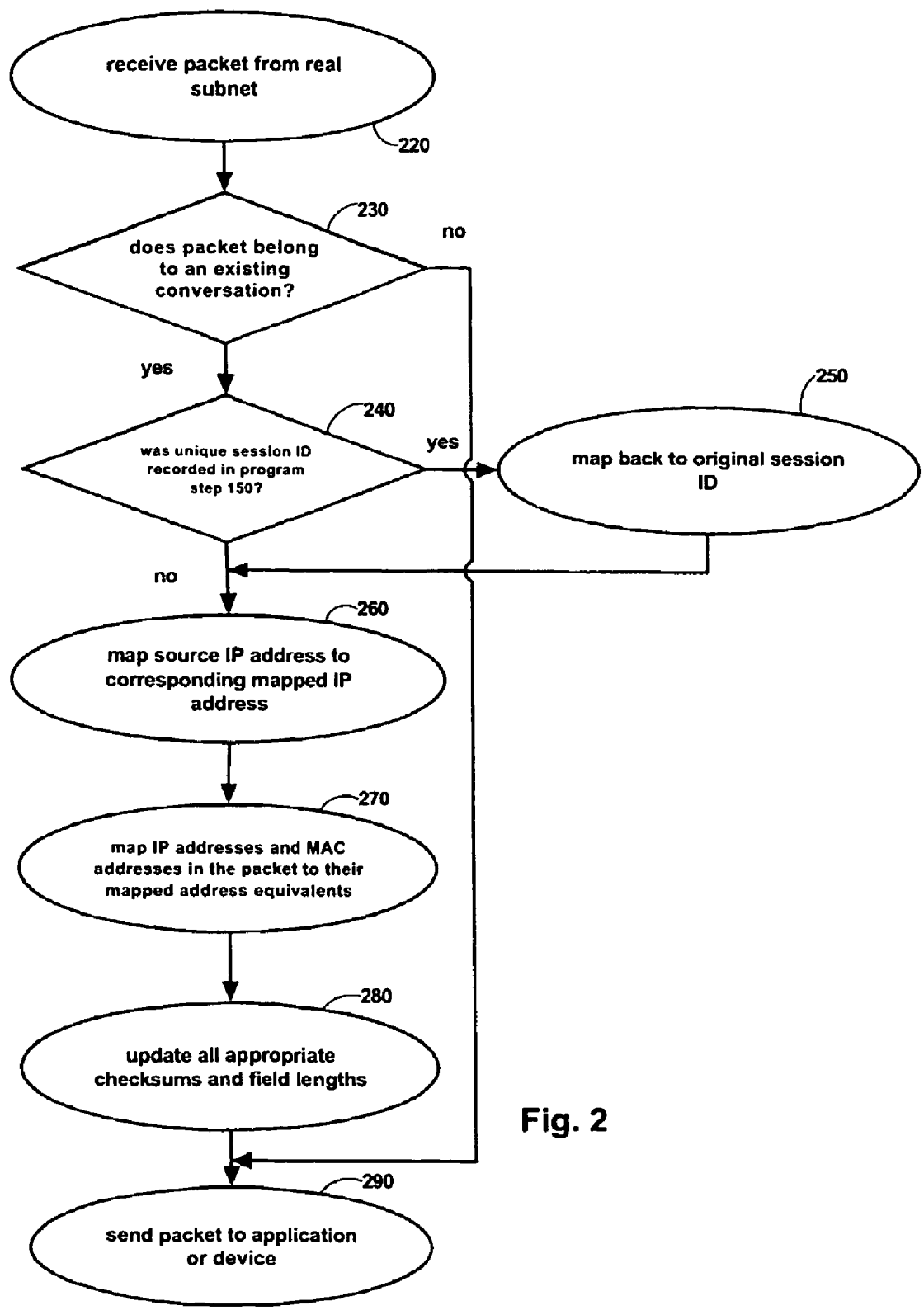
FIG. 2 is a flow diagram illustrating a program for modifying packets sent from the real network to an application or device, in accordance with the invention.

Given all the preceding details, the high-level illustration method in FIGS. 1 and 2 of mapping a packet between mapped subnets and the real subnet is as follows:

1. If the packet is being sent to a mapped subnet then:
    a. Search in step 110 for an existing conversation that the packet belongs to.
    b. If no match is found then in step 120 record enough details of the packet to identify any response from the real subnet, including at least:
        i. The mapped IP subnet the packet was originally destined to.
        ii. The session ID, or equivalent value.

If necessary, map the existing session ID, or equivalent value, to a new unique session ID and record this also in steps 130 to 150.
  c. If a match is found determine if it includes a unique session ID in step 160, otherwise in step 170 map session ID or equivalent value to the unique session ID, that was recorded by the shim in step 150.
  d. Map the destination IP addresses of the packet to the corresponding real IP addresses in step 180.
  e. Map any IP addresses and MAC addresses in the packet contents to their real address equivalents in step 190.
  f. Update all appropriate checksums and length fields in step 200.
  g. Send the packet out onto the network in step 210.
2. Otherwise, if the packet is being received from the real subnet in step 220 then:
  a. Search in step 230 for an existing conversation that the packet belongs to. The following steps assume a match is found. See later for details of handling packets that do not belong to known conversations.
  b. Determine in step 240 if the unique session ID or equivalent was recorded in step 150, or equivalent and if it was map the session ID back in step 250.
  c. Map the source IP address of the packet to the corresponding mapped IP address in step 260.
  d. Map any IP addresses and MAC addresses in the packet contents to their mapped address equivalents in step 270.
  e. Update all appropriate checksums and length fields in step 280.
  f. Pass the packet up to the network management application in step 290.

Handling Unknown Packets from the Real IP Subnet

There are various circumstances that can result in packets being received from the devices on the real IP subnet that do not correspond to existing known conversations, including packet resends, packets that correspond to a conversation that has timed out and notification packets (such as SNMP traps). The simplest course of action in all these situations is to send the packets unmodified to the network management application as illustrated in FIG. 2. This will not detract from the functionality of the shim.

However, in the case of notification packets it may be beneficial to the testing of network management application if these are mapped to one or more of the mapped IP subnets. This allows, for example, data held in SNMP traps to be acted upon by the network management application. The process of performing this mapping is obvious given the description above.

The simplest approach to handling notification packets is either to always map such packets to the same mapped IP subnet (e.g. the first known mapped IP subnet) or to map each such packet to all IP mapped subnets, resulting in multiple packets being sent to the network management application for each received notification packet. Alternative such as a round-robin approach (i.e. keep a note of the last mapped IP subnet that a notification packet was mapped to and map the next received notification packet to the next mapped subnet in the list of mapped subnets) are possible. However, as some notification mechanisms use states indicated by previous notification packets to affect the meaning of subsequent notification packets, such alternatives cannot be applied to all notification mechanisms.

Distributed Network Management Application

The invention as described above assumes a network management application running on a single server. However, it may be modified for use with network management applications that have their data collection software distributed over multiple servers by having a modified shim run on each server that shares mapping information (i.e. details of the mapped IP subnets and MAC address mappings) with the other shims.

Note that there are standard techniques for such sharing of information through distributed systems.

IP Address Mapping

In the preferred embodiment, the following process is used to map an IP address from one IP subnet to another.

Each IP mapping is between two subnets (one real, one "mapped"), as opposed to a large number of single IP address to single IP address mappings. As a result, each IP mapping has three parameters:
  1. The subnet address of the real subnet (e.g. 123.45.67.0).
  2. The subnet address of the mapped subnet (e.g. 10.0.0.0).
  3. The subnet mask that applies to both subnets (e.g. 255.255.255.0).

The "dot" notation used for IP addresses (i.e. A.B.C.D) and masks is shorthand for the binary representation of the addresses/masks. Each number in the address/mask represents a value in the range 0-255 which, in binary, is an 8-bit unsigned value. 0=00000000 (base 2), 255=11111111 (base 2). So the above addresses and mask can be represented by 32-bit binary values:

| | | | | |
|---|---|---|---|---|
| 1. 123.45.67.0 == | 01111011 | 00101101 | 01000011 | 00000000 |
| 2. 10.0.0.0 == | 00001010 | 00000000 | 00000000 | 00000000 |
| 3. 255.255.255.0 == | 11111111 | 11111111 | 11111111 | 00000000 |

In order to identify the correct IP mapping to use for a particular outgoing packet the shim searches through the list of IP mappings one by one and for each IP mapping it performs the following:
  1. Perform a logical AND (represented as && hereafter) of the destination IP address in the packet with the subnet mask associated with the IP mapping.
  2. Compare the result of the && with the subnet address of the mapped subnet in the IP mapping.
  3. If the result is equal to the subnet address of the mapped subnet in the IP mapping then the shim has found the correct IP mapping to use and can stop searching.

So, for example, if the shim is searching through the list of IP mappings and gets to the IP mapping described above, and the packet has the destination IP address 10.0.0.5 (==00001010 00000000 00000000 00000101), then we perform the following:
  1. && of destination IP address in the packet with the subnet mask associated with the IP mapping:

| | | | |
|---|---|---|---|
| 00001010 | 00000000 | 0000000 | 00000101 |
| 11111111 | 11111111 | 11111111 | 00000000 && |
| ========= | ========= | ========= | ========= |
| 00001010 | 00000000 | 00000000 | 00000000 |

2. Compare the result of the && (00001010 00000000 00000000 00000000) with the subnet address of the mapped sheet in the IP mapping (00001010 00000000 00000000 00000000).
  3. The result is equal to the subnet address of the mapped subnet in the IP mapping, so the shim has found the correct IP mapping and can stop the search.

If, on the other hand, the shim is searching through the list of IP mappings and gets to the IP mapping described above, and the packet has the destination IP address 12.34.56.78 (==00001100 00100010 00111000 01001110), then the shim performs the following:
1. && of destination IP address in the packet with the subnet mask associated with the IP mapping:

| 00001100 | 00100010 | 00111000 | 01001110 |
| 11111111 | 11111111 | 11111111 | 00000000 && |
| 00001100 | 00100010 | 00111000 | 00000000 |

2. Compais the result of the && (00001100 00100010 00111000 00000000) with the subnet address of the mapped subnet in the IP mapping (00001010 00000000 00000000 00000000).
3. The result is NOT equal to the subnet address of the mapped subnet in the IP mapping, so the shim has not yet found the correct IP mapping and must continue to search.

This technique works because the && with the subnet mask effectively strips away any "host-specific" address information in the IP address to leave the subnet address corresponding to the IP address, assuming that the IP address is on a network with the given mask.

In order to map an IP address from one subnet (the "source" subnet) to another (the "destination" subnet) in an IP mapping the shim performs the following steps:
1. Calculate the logical NOT (represented as ! hereafter) of the subnet mask associated with the IP mapping.
2. Perform an && of the IP address with the result of the !.
3. Perform a logical OR (represented as .parallel. hereafter) of the result of the && with the destination subnet address.

So, for example, if the shim has identified the IP subnet above as the correct subnet, and the shim needs to map the IP address 10.0.0.99 from the mapped subnet to the real subnet then it performs the following steps:
1. ! of subnet mask associated with the IP mapping:

| 11111111 | 11111111 | 11111111 | 00000000 ! |
| 00000000 | 00000000 | 00000000 | 11111111 |

2. && of IP address with result of !:

| 00001010 | 00000000 | 00000000 | 01100011 |
| 00000000 | 00000000 | 00000000 | 11111111 && |
| 00000000 | 00000000 | 00000000 | 01100011 |

3. || of result of && with real subnet address:

| 00000000 | 00000000 | 00000000 | 01100011 |
| 01111011 | 00101101 | 01000011 | 00000000 || |
| 01111011 | 00101101 | 01000011 | 01100011 |

Converting this back to decimal numbers and the "dot" notation, the notation produces the real IP address: 123.45.67.99.

Note that in this example, as the shim is mapping from the mapped subnet to the real subnet, the real subnet is the destination subnet, and so the last step .parallel. s the result of the && with the real subnet's address. If the shim is mapping from real IP address to the mapped IP address then the procedure is pretty much the same, the only difference being that in the last step its the result of the && with the mapped subnet address.

The invention claimed is:
1. A computer program on computer readable non-transitory medium loaded onto a digital computer and executed, when executed comprising the following steps:
receiving a packet from an application or a device;
if the packet belongs to an existing conversation then going to a session ID check process;
otherwise recording a mapped subnet and a session ID;
if said session ID is unique then going to a mapping process,
otherwise mapping said session ID to a unique session ID;
recording said unique session ID and going to the mapping process;
wherein the session ID check process comprises the following steps: if the session ID is unique then going to the mapping process,
otherwise mapping the session ID to the unique session ID and going to the mapping process;
wherein the mapping process comprises the following steps: mapping a destination IP address to a real IP address equivalents;
mapping a source IP address, the destination IP address, a source MAC address and a destination MAC address in the packet to their real address equivalents;
updating a checksum and field lengths; and
sending the packet out onto a network.
2. A computer program on computer readable non-transitory medium loaded onto a digital computer and executed, when executed as claimed in claim 1 comprising the following steps:
receiving a packet from a real network;
if the packet from the real network does not belong to an existing conversation then going to a send process,
otherwise if there was not a unique session ID recorded in the earlier steps, then going to a continuation process;
mapping back to the original session ID going to the continuation process;
wherein the continuation process comprises the following steps: mapping the source IP address to the corresponding mapped IP address;
mapping a source IP address, the destination IP address, a source MAC address and a destination MAC address in the packet from the real network to their mapped address equivalents;
updating all appropriate checksums and field lengths and going to the send process;
wherein the send process comprises the following steps: sending the packet to the application or device.

* * * * *